July 30, 1940.   J. TICHÝ   2,209,485
APPARATUS FOR DETERMINING THE VELOCITY OF A TARGET, ESPECIALLY AIRCRAFT
Filed June 21, 1938   2 Sheets-Sheet 1
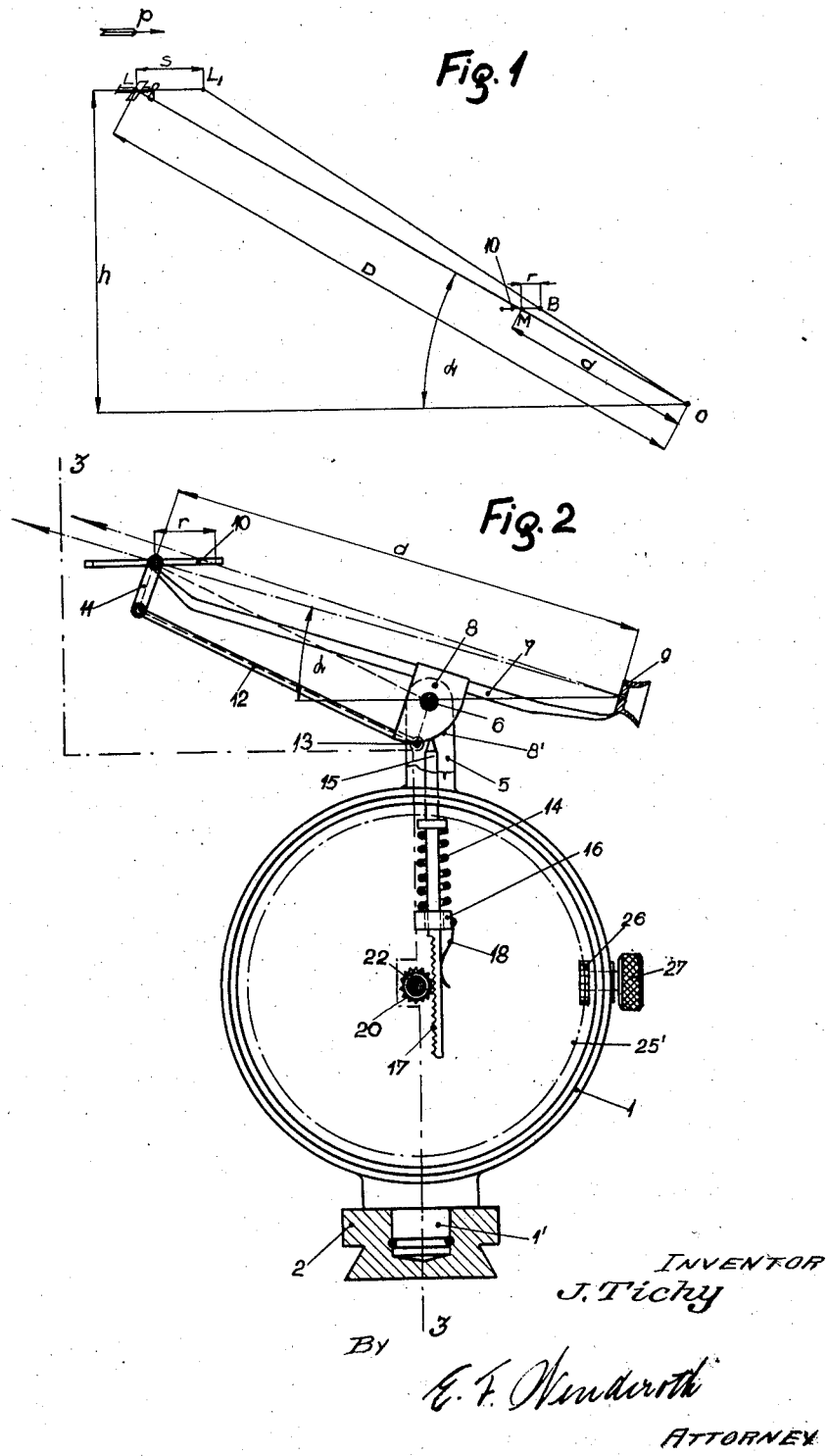
INVENTOR
J. Tichy
BY
E. F. Wenderoth
ATTORNEY July 30, 1940.  J. TICHÝ  2,209,485
APPARATUS FOR DETERMINING THE VELOCITY OF A TARGET, ESPECIALLY AIRCRAFT
Filed June 21, 1938   2 Sheets-Sheet 2
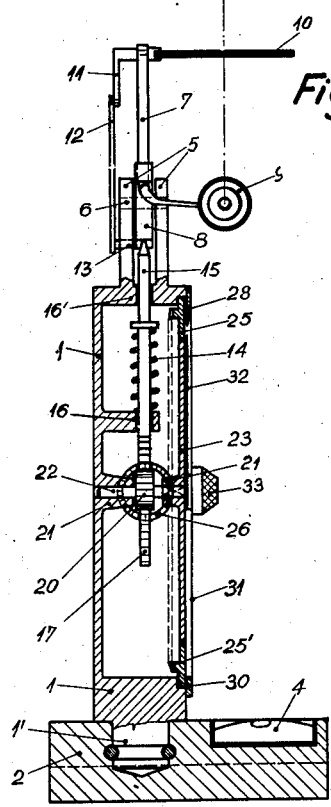
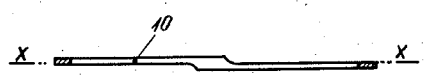
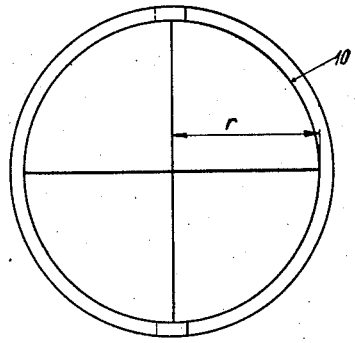
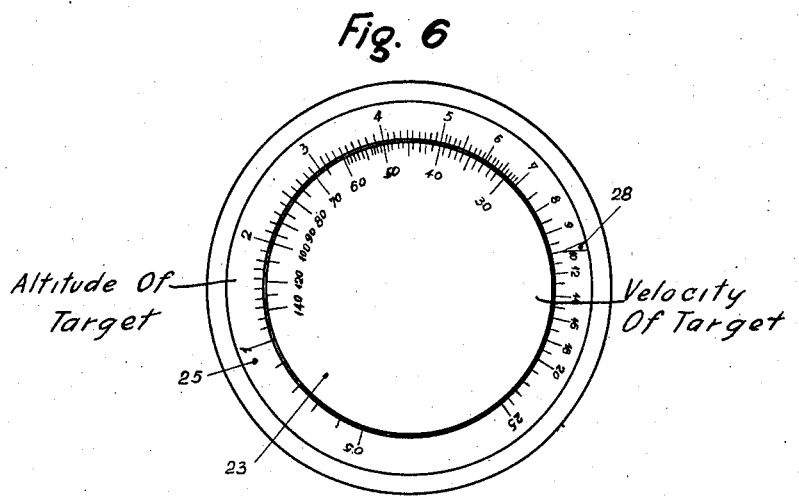
INVENTOR
J. Tichy
By
E. F. Wenderoth
ATTORNEY Patented July 30, 1940

2,209,485

UNITED STATES PATENT OFFICE 2,209,485

APPARATUS FOR DETERMINING THE VELOCITY OF A TARGET, ESPECIALLY AIRCRAFT

Josef Tichý, Brunn, Czechoslovakia, assignor to Československá Zbrojovka, a. s., Brno, Brunn, Czechoslovakia, a company of Czechoslovakia Application June 21, 1938, Serial No. 215,043
In Czechoslovakia June 18, 1937

5 Claims. (Cl. 33—64)

This invention relates to apparatus for determining the velocity of a target, especially aircraft which is moving in a straight line in a horizontal plane.

The known devices employed for this purpose are either inaccurate or, if they are accurate, they are expensive and complicated. Ordinarily, they have to be attended to by a number of persons, so that their employment, for example, under war conditions, is rendered difficult.

The chief object of the present invention is to obviate the disadvantages of the known devices and to provide a simple and easily transportable apparatus, which is readily operated, for the purpose of determining more particularly the velocity of aircraft.

According to the present invention, there is provided apparatus comprising sighting means which, on sighting the target, mark out, by means of the projection into space from a central point of observation, the path on which the velocity is measured, the length of the measuring path being at a given ratio to the instantaneous distance of the target from the observer.

The apparatus according to the present invention can also be used on board aircraft either for determining the velocity of the aircraft or, if the velocity of flight is known, for determining the height of the aircraft above the ground.

In order that the present invention may be clearly understood and readily carried into effect the same will now be described more fully, by way of example, with reference to the accompanying drawings in which:

Figure 1 illustrates diagrammatically the method of determining the velocity of aircraft by means of apparatus embodying the invention, Figure 2 is a sectional side elevation of apparatus embodying the invention, Figure 3 is a vertical cross-sectional view thereof taken on the section line 3—3 of Fig. 2, Figures 4 and 5 show in cross-section and in plan, respectively, details of a circular sight of the sighting device of the apparatus, Figure 6 is a detail view showing in elevation the scales of the calculating device of the apparatus.

Referring to the drawings, in Figure 1, L denotes the aircraft which is moving in a straight line with the velocity $v$ in an horizontal plane which is at a height $h$ above the standing position O of the observer. The height $h$ is known and one of the known independent devices is employed for its determination.

The velocity $v$ of a uniformly moving point is ascertained by setting up the definite path $s$, the so-called measuring path, and by measuring the time $t$ in which the point travels through the path $s$. The mean velocity $v$ is given by the ratio $$\frac{s}{t}$$

By means of the apparatus according to the present invention, the measuring path $s$ in the path of flight is set up by the projection of the horizontal abscissa from the centre O which represents the eye of the observer of the diopter. There is advantageously chosen as the projection abscissa the radius $r$ of the horizontal circle which is at a definite known ratio, $r:d=k$, to the distance of the centre M of the circle from the projection centre O. In the case illustrated, $k=0.1$.

It is seen from the similarity of the triangles OMB and OLL₁ that the measuring path $s$, which is set up in the path of flight of the aircraft, is in the same ratio to the distance D of the aircraft as is the radius $r$ of the circle to the distance $d$ of the centre m of the circle from the point O, $$s:D=r:d=k$$

or $$s=kD$$

In order to be able to ascertain the measuring path $s$, it is therefore sufficient to determine the distance D of the aircraft, at the beginning of the measurement, from the standing place of the observer. It can be seen that $$D=\frac{h}{\sin \alpha}$$

where $\alpha$ is the position angle, which the line of sight OL makes with the horizontal plane, and $h$ is the height of the aircraft. This equation is solved mechanically on the apparatus according to the present invention for different position angles $\alpha$ by the geometric adding up of the logarithms on the basis of the relationship which results from the logarithmising of the aforesaid equation:

$$\log D=\log h-\log \sin \alpha$$

The velocity $$v=\frac{s}{t}$$

is ascertained from the known path $s$ from the measured time $t$ which the aircraft took for flying through the path, the calculation of the velocity being likewise effected on the apparatus logarithmically in accordance with the equation.

$$\log v = \log s - \log t$$

An example of a constructional embodiment of the apparatus according to the invention is illustrated in Figures 2 to 6.

1 denotes a cylindrical casing to which a base plate 2 is connected by means of a cotter pin 1'. The base plate 2 is adapted to permit the apparatus to be located on a stand (not shown.) For the purpose of adjusting the casing in a vertical position there is employed a spirit level 4 which is arranged in the base plate 2.

The casing 1 is provided at the top part on the periphery with two lugs 5 (Figures 2 and 3) in which a lever 7 of the first order is rotatably mounted on a horizontal pin 6. On one arm of the lever 7, a diopter 9 is arranged, and to the other arm of the said lever there is rotatably connected a fixed circle 10, the so-called circular sight (Figure 5), which is provided with crossed threads and is always kept in a horizontal position by means of a known device. In the example shown, the said device consists of a parallelogram which is formed by two levers 11 and 12 which are hingedly connected with each other and of which the lever 11 is connected to the pin of the circle 10 and the lever 12 is connected to the lug 5 by means of a pin 13. The radius $r$ of the circular sight 10 is equal to 0.1 of the distance $d$ of the diopter from the centre of the circle 10 (Figures 2 and 5).

A cam 8 with a controlling surface is connected to the lever 7, so that it rotates about the pin 6 conjointly with the lever. The curvature of the surface is made to depend upon the angle position $\alpha$ in accordance with the equation.

$$\rho = k_1 + k_2 \log \sin \alpha$$

where $\rho$ is the polar coordinate and $k_1$ and $k_2$ are constants. The controlling surface of the cam contacts at its summit with a rod 15 which is mounted vertically in bearings 16 and 16' of the casing 1 (Figures 2 and 3). The rod 15 is loaded by means of a spring 14 which keeps the upper pointed end of the rod in contact with the controlling surface 8' of the cam. The other end of the rod 15 is flattened and provided with a toothed rack 17 which engages a pinion 20. The engagement of the pinion with the rack is ensured by a leaf spring 18. The pinion 20 is keyed on a horizontal shaft 22 which is mounted in bearings 21 and 21' in the axis of the cylindrical casing 1. The shaft 22 has a square portion on which there is fitted a disc wheel 23 with a scale which gives the velocity—for example in metres per second—and the size of the measuring path $s$ in space. Disposed around the circumference of the disc wheel 23 is a ring 25 which is rotatably mounted in such a manner in the casing 1 that the front surface of the ring 25 and the front surface of the disc wheel 23 lie in the same plane. On the ring 25 there is engraved a scale which gives the height of the aircraft and also the time in seconds and against which there is arranged a pointer 26 which is fixed to the casing 1. The opposite side of the ring 25 is provided with a ring of teeth 25' (Figures 2 and 3) with which a pinion 26 engages. The pinion 26 is keyed on a shaft which passes through the cylindrical wall of the casing and is provided with a milled knob 27 (Figure 2) for the purpose of being rotated by hand. The ring 25 is held fast in its bearing by means of a lid 30 which is secured to the casing 1. If desired, the lid may be provided with a glass 31 to protect the scale from dust and effects of the weather.

In order that, by the projection of the circular sight, its image should remain undistorted owing to the thickness of the material, the sight is arranged in the particular manner shown in Figures 4 and 5. The circle 10 consists of a narrow ring which is constructed in such a manner that the halves of the ring are displaced in relation to each other through a distance equal to the thickness of the material, so that the edges of the circle, which are projected from the diopter, lie in the same plane X—X. The centre of the circle is indicated by the centre of the crossed threads.

In ascertaining the velocity $v$ of aircraft by means of the apparatus according to the present invention, the operation is as follows:

After adjusting the apparatus into the vertical position by means of the level 4, sighting the aircraft by means of the diopter 9 and the circular sight 10 is effected in such a manner, by the rotation of the whole apparatus about the vertical pin 1' as well as by the rotation of the lever 7 in the plane of elevation, that an aircraft, which is flying in any direction in relation to the observer, is projected into the centre of the crossed threads. While the aircraft is being followed, the cam 8 and the lever 7 are in the plane of elevation, so that their movement is directly dependent upon the position angle $\alpha$.

At the instant in which the desired sighting is obtained, the movement of the apparatus is stopped and is kept in its position by means of, for example, the coupling which connects the fixed part of the apparatus with the lever 7 or by means of another similar device. At that instant, the measurement, by means of a stop watch, of the time, which the aircraft takes to fly through the path $LL_1$, which is proportional to the radius of the sight 10, is begun. When, during the uninterrupted observation by means of the diopter, the circumference of the circle is reached, the measurement of the time of flight is ended.

The ascertainment of the measuring path $s$ in accordance with the equation $$s = k \frac{h}{\sin \alpha}$$

is carried out on the calculating device, which is arranged in the manner of a circular slide rule one scale of which is engraved on the disc 23 and the other is engraved on the ring 25. The height $h$ of the aircraft, which is ascertained by an independent apparatus of known construction, is set on the scale of the ring 25 which is rotated by hand by means of the knob 27 in such a manner that the number that denotes the height of the aircraft comes beneath the pointer 26.

On rocking the lever 7, the movement of the controlling cam surface 8' is transmitted to the small rod 15 and from this, by means of the rack 17, to the pinion 20 and, by means of the shaft 22, to the disc 23. The disc 23 is consequently rotated in dependence upon the logarithm of the sine of the position angle $\alpha$ in such a manner that the opposite position of the logarithmic scale gives the desired length of the measuring path $s$. The numbers which give the measuring path $s$ appear on the scale of the disc 23 opposite the ring 25.

The velocity $v$ of the aircraft is ascertained from the equation $$v=\frac{s}{t}$$

when the value is read off on the second scale giving the velocity opposite the number denoting the measured time. Since, in logarithmic division, the logarithms are subtracted from each other, the time scale is put on in the reverse direction of the scale of the path $s$.

In the example of the counting calculating device which is illustrated in Figure 6, the logarithmic scale of heights expressed in hectometres (hm.) and the time expressed in seconds on the outer ring 25 and the scale of the path $s$ expressed in metres and the velocity of aircraft expressed in metres per second on the disc 23 are advantageously combined. This combination is possible since all the scales are logarithmic.

The following case illustrates an example of measurement with reference to Figure 6:

Let the height of flight $h=1000$ metres. Consequently, the ring 25 is set in such a manner by the rotation of the knob 27 that the number "10" on its scale comes beneath the pointer 28. After the aircraft is sighted with the apparatus, the time is measured which the aircraft has taken to fly over the projection of the radius of the circular sight. Let this time $t$ be 4 seconds. The velocity of the aircraft $v=50$ metres per second is read off on the velocity scale on the disc 23 opposite the number "4" on the ring 25.

The manipulation of the apparatus is very simple and the total time that is necessary for the determination of the velocity of aircraft is only the time that is necessary for the measurement of the time of flight of the aircraft over the radius of the sight. A further great advantage of the apparatus according to the invention is that it is unnecessary to measure the height of flight at the outset but it is possible to carry out the measurement of the height of flight on a separate height meter and then to set the measured height on the apparatus, so that the result of the measurement of the velocity of the aircraft is obtained at once. This saving of time is of special importance when the apparatus is used for the determination of firing elements in the case of anti-aircraft guns.

The apparatus does not take up much space, is readily transportable and contains no sensitive components by the injury of which the measurement could be rendered imposible or inaccurate.

The sighting means of the apparatus may be of a kind other than the circular sight and the diopter; thus, in particular, it is possible to use a telescope for setting up the line of sight, it being possible to carry out the limitation of the measuring path in such a manner by means of a circle that is kept horizontal or by the aid of means arranged in the telescope that the measuring path is at a definite ratio to the distance of the aircraft from the position at which the observer is standing.

It is possible to use the principle of the apparatus according to the invention for apparatus for other purposes of which there is given as an example an apparatus for the measurement of the height of aircraft above the ground from on board the aircraft. The method of measurement by means of this apparatus is represented in Figure 9.

Let the aircraft be moving with a known velocity $v$ in a straight line in an horizontal plane at an unknown height $h$ above the ground. By means of the apparatus, which can be suspended in the aircraft in such a manner that its basal surface is kept in the horizontal position, any point C on the ground is aimed at in such a manner that the point C is projected into the centre of the circular sight. The angle, which the line of sight makes with the horizontal plane, is the position angle $\alpha$. At that instant, the position of the arm of the sighting device is fixed and there is begun the measurement of the time in which the aircraft flies through a path such that the point C is projected on the edge of the circular sight. At the beginning of the measurement, the aircraft was located at the point A and, during the measurement, it came to the point B and followed the path which is equal to the result of the time and of the velocity, $s=v.t$.

From the similarity of the triangles MLA and ABC, it can be seen that the path $s=v.t.$ is equal to $k$ times the distance D of the point C from the initial position A of the aircraft, where $k$ is the ratio of the radius of the sight to the distance of the centre of the sight from the diopter. This, therefore, gives $$D=\frac{1}{k}vt$$

and, because $h=D \sin \alpha$, it is possible to determine the height $$h=\frac{1}{k}vt \sin \alpha$$

from the measured time $t$, the known velocity $v$ and the position angle $\alpha$.

The multiplication is effected logarithmically on the calculating mechanism of the apparatus as in the preceding case, log sin $\alpha$ again being given on the apparatus by the controlling cam.

A special case arises if there is always chosen the point C on the ground in such a manner that it lies in the vertical plane through the axis of flight. In this case, it is sufficient for the marking out of the path $s$ to have a small section of a circular sight in the neighbourhood of the small axis of the ellipse produced by the projection of the circular sight, since the projection of the point C theoretically moves on the small axis of the ellipse.

The forms of the apparatus described and illustrated are obviously only examples of embodiments of the invention and it is possible to make various modifications in the construction of the apparatus without departing from the scope of the invention.

What I claim is:

1. Apparatus for determining the velocity of a target moving rectilinearly in a horizontal plane comprising a base, a member pivoted on said base on a normally horizontal axis, a circular sight pivoted on said member on an axis coplanar of said circular sight and parallel to said first axis, a diopter on said member coacting with said circular sight to establish a sight line which may be maintained upon the target, relatively movable coacting scales carried by said base and means interconnecting said scales and said member whereby pivoting of said member about its axis effects relative movement of said scales to give a reading thereon of target velocity as the sight line is maintained thereon.

2. Apparatus as set forth in claim 1 in which said interconnecting means includes a cam operated synchronously with the pivotal movement of said member whose radial dimensions are proportioned to a trigonometrical function of the angle said sight line makes with the horizontal.

3. Apparatus as set forth in claim 1 in which said scales are respectively located on two circular cooperating discs.

4. Apparatus for determining the velocity of a target moving recilinearly in a horizontal plane comprising a base, a member pivoted on said base on a normally horizontal axis, a circular sight pivoted on said member on an axis coplanar of said circular sight and parallel to said first axis, a diopter on said member coacting with said circular sight to establish a sight line which may be maintained upon the target, a cam on said member operated synchronously with the pivotal movement of said member whose radial dimensions are proportioned to a trigonometrical function of the angle said sight line makes with the horizontal, a circular disc having a scale thereon rotatably mounted on said base, a slidably mounted rod on said base actuated by said cam for rotating said disc and a second manually operated circular disc having a scale thereon coacting with said first mentioned scale to give a reading of target velocity as the sight line is maintained thereon.

5. Apparatus for determining the velocity of a target moving rectilinearly in a horizontal plane comprising a base, a member pivoted on said base on a normally horizontal axis, a circular sight pivoted on said member on an axis coplanar of said circular sight and parallel to said first axis, said circular sight having the halves thereof relatively displaced axially of the plane of said circular sight an amount equal to the thickness of the material on both sides of the axis of said circular sight, a diopter on said member coacting with said circular sight to establish a sight line which may be maintained upon the target, relatively movable coacting scales carried by said base and means interconnecting said scales and said member whereby pivoting of said member about its axis effects relative movement of said scales to give a reading thereon of target velocity as the sight line is maintained thereon.

JOSEF TICHÝ.